US007496768B2

(12) United States Patent
Roberts et al.

(10) Patent No.: US 7,496,768 B2
(45) Date of Patent: Feb. 24, 2009

(54) PROVIDING SECURE INPUT AND OUTPUT TO A TRUSTED AGENT IN A SYSTEM WITH A HIGH-ASSURANCE EXECUTION ENVIRONMENT

(75) Inventors: Paul C. Roberts, Kirkland, WA (US); Christine M. Chew, Redmond, WA (US); Bryan Willman, Kirkland, WA (US); Kenneth D. Ray, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 685 days.

(21) Appl. No.: 10/693,407

(22) Filed: Oct. 24, 2003

(65) Prior Publication Data

US 2005/0091503 A1 Apr. 28, 2005

(51) Int. Cl.
*H04L 9/32* (2006.01)
*H04L 9/00* (2006.01)
*G06F 11/30* (2006.01)
*G06F 17/30* (2006.01)

(52) U.S. Cl. .................. 713/193; 713/192; 713/194; 713/164; 713/165; 713/166; 713/167; 726/2; 726/3; 726/4; 726/5; 726/6; 726/7; 726/26; 726/27; 726/28; 726/29; 380/200; 380/201

(58) Field of Classification Search .................. 713/193
See application file for complete search history.

(56) References Cited

U.S. PATENT DOCUMENTS 5,822,435 A * 10/1998 Boebert et al. .............. 713/192
7,159,210 B2 * 1/2007 Griffin et al. ............... 717/141

2002/0070920 A1   6/2002   Challener et al. .......... 345/168

FOREIGN PATENT DOCUMENTS

EP   0 588 083   3/1994
EP   0 526 426   4/2005

OTHER PUBLICATIONS

Garfinkel, T . et al., "Terra: A Virtue Machine-Based Platform for Trusted Computing", *ACm Symposium on Operating Systems Principles, Proceedings of the nineteenth (19th) ACm Symposium on Operating Systems Principles*, 2003, 193-206.

(Continued)

*Primary Examiner*—Longbit Chai
(74) *Attorney, Agent, or Firm*—Woodcock Washburn LLP (57) ABSTRACT

Techniques are disclosed to provide security for user output and input in which a first, host operating system is used along with a second, high assurance operating system (nexus), where the first system provides at least some of the infrastructure for the second system. A trusted UI engine has a trusted input manager and a trusted output manager. The trusted input manager controls access to trusted input, distributing decrypted input to the host operating system where appropriate, or to the appropriate process running in the nexus. The trusted output manager manages output to the display, and allows trusted agents in the nexus to output data for display without needing to be aware of output-device-dependent details.

19 Claims, 6 Drawing Sheets

OTHER PUBLICATIONS

Josang, A. et al., "User Interface Requirements for Authentication of Communication", *ACM International Conference Proceeding Series, Proceedings of the Fourth Australian User Interface Conference on User Interfaces 2003*, 2003, 18, 75-80.

Kent, S.T., "Encryption-Based Protection for Interactive User/Computer Communication", *Proceedings of the Fifth Symposium on Data Communications*, 1977, 5.7-5.13.

Landwehr, C.E. et al., "A Taxonomy of Computer Program Security Flaws", *ACM Computing Surveys (CSUR)*, 1994, 26(3), 211-254.

Salles, E.J. et al., "Security of runtime Extensible Virtual Environments", *Collaborative Virtual Environments, Proceedings of the 4th International Conference on Collaborative Virtual Environments*, 2002, 97-104.

Spalka, Adrian, Cremers, Armin B., Langweg, Hanno, "Protecting the Creation of Digital Signatures with Trusted Computing Platform Technology Against Attacks by Trojan Horse Programs", *Trusted Information. The New Decade Challenge. Proceedings of IFIP/SEC'01*, 2001, 403-419.

Epstein, J. et al., "User Interface for a High Assurance Windowing System", *Computer Security Applications Conference, IEEE Computer Soc.*, 1993, 256-264, XP010096756.

Kilpatrick, D. et al., "Securing the X Window System with SELinux", Mar. 2003, http://www.nsa.gov/selinux/papers, 33 pages, XP-002327143.

At WinHEC, Microsoft Discusses Details of Next-Generation Secure Computing Base, http://www.microsoft.com/presspass/features, May 2003, 8 pages.

* cited by examiner

PROVIDING SECURE INPUT AND OUTPUT TO A TRUSTED AGENT IN A SYSTEM WITH A HIGH-ASSURANCE EXECUTION ENVIRONMENT

FIELD OF THE INVENTION

The present invention relates generally to the field of computer security. More particularly, the invention relates to the use of plural execution environments (e.g., operating systems) on a single computing device, and provides techniques that allow for the integrity of input and output of data for a trusted agent in a higher-assurance execution environment from among the plural execution environments.

BACKGROUND OF THE INVENTION

In modern computing, many tasks which can be performed on a computer require some level of security. In order to provide a level of security, there are several options. One is to perform all secure applications on a computer which is completely separate from any possibly insecure elements, or to use a virtual machine monitor (VMM) to allow complete separation between two execution environments (e.g. operating systems) running on a single computer system. However, this may be impractical. There may be a need, for cost or convenience reasons, for a secure execution environment to share resources with applications with unassured security, and those applications and those resources may be vulnerable to an attacker. Additionally, where a VMM is used, since a VMM requires full virtualization of the machine and all of its devices (thereby requiring that the VMM provide its own device driver for every possible device), a VMM is not well suited to an open architecture machine in which an almost limitless variety of devices can be added to the machine.

One way to provide the ability to share resources among two execution environments is to provide a computer system in which there is one "main" operating system that controls most processes and devices on a machine, and where a second operating system also exists. This second operating system is a small, limited-purpose operating system alongside the main operating system which performs certain limited tasks. One way to make an operating system "small" or "limited-purpose" is to allow the small operating system to borrow certain infrastructure (e.g., the scheduling facility, the memory manager, the device drivers, etc.) from the "main" operating system. Since a VMM effectively isolates one operating system from another, this sharing of infrastructure is not practical using a VMM.

Certain other techniques allow operating systems to exist side-by-side on the same machine without the use of a VMM. One such technique is to have one operating system act as a "host" for the other operating system. (The operating system that the "host" is hosting is sometimes called a "guest.") In this case, the host operating system provides the guest with resources such as memory and processor time. Another such technique is the use of an "exokernel." An exokernel manages certain devices (e.g., the processor and the memory), and also manages certain types of interaction between the operating systems, although an exokernel—unlike a VMM—does not virtualize the entire machine. Even when an exokernel is used, it may be the case that one operating system (e.g., the "main" operating system) provides much of the infrastructure for the other, in which case the main operating system can still be referred to as the "host," and the smaller operating system as the "guest." Both the hosting model and the exokernel model allow useful types of interaction between operating systems that support sharing of infrastructure.

Thus, these techniques can be used to provide a computer system with at least two execution environments. One of these may be a "high-assurance" operating system, referred to herein as a "nexus." A high-assurance operating system is one that provides a certain level of assurance as to its behavior. For example, a nexus might be employed to work with secret information (e.g., cryptographic keys, etc.) that should not be divulged, by providing a curtained memory that is guaranteed not to leak information to the world outside of the nexus, and by permitting only certain certified applications to execute under the nexus and to access the curtained memory.

In a computer system with two execution environments, one of which is a nexus, it may be desirable for the nexus to be the guest operating system, and a second operating system, not subject to the same level of assurance as to behavior, to be the host operating system. This allows the nexus to be as small as possible. A small nexus allows a higher level of confidence in the assurance provided by the nexus.

However, the high-assurance nature of the nexus requires high-assurance for input and output to processes running on the nexus, so that no process or other entity from the host operating system can read or alter the data entered by the user, or the data being displayed or output to the user. But allowing the host operating system to handle input and output and relay information to the nexus for its processes would imperil the high-assurance nature of the nexus. Additionally, input may be from a trusted user input device which encrypts the input, and it may be necessary to decrypt the data using a secret held within the nexus which should not be divulged to the host.

Input/output (I/O) functions such as rendering and detecting and handling user events on graphical user interface elements which are being displayed to the user are often provided by a common resource for all processes. However, providing this functionality in a host operating system requires that data to be rendered be passed to the host for rendering. This provides a possible avenue of attack on the high-assurance nature of the process passing the data out for rendering, as the data being sent for rendering may be read or altered by a host-side entity which should not have access to the data. The same vulnerability is present in the notification that a user event has occurred.

In view of the foregoing there is a need for a system that overcomes the drawbacks of the prior art.

SUMMARY OF THE INVENTION

The security of a secured execution environment on a system with a secured execution environment and a second execution environment is maintained using a trusted UI engine. The trusted UI engine arbitrates user input to the secured execution environment and output from processes in the secured execution environment to a display or output device.

In one embodiment, one component of the trusted UI engine is a trusted input manager. When encrypted input arrives from a trusted input device, the trusted input manager decrypts the input. A determination is then made if the input should remain in the secured execution environment or sent to the second execution environment. Encrypted input is passed to the second execution environment only after a determination in the secured user environment.

One component of the trusted UI engine is a trusted output manager. In order to provide security for the output, the trusted output manager functions as the contact point for all entities in the secured execution environment the output device.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

When two execution environments, such as operating systems, run side-by-side on a single machine, it must be determined how user input and output should be accessed by the operating systems. Moreover, one of the operating systems may need to be protected from accessing user input or output for or from the second operating system or an entity running on the second operating system. The present invention provides techniques that allow user input and output directed at or coming from a high assurance entity on a nexus to be protected from possible discovery by host operating system entities.

Exemplary Computing Arrangement

Figure 1:
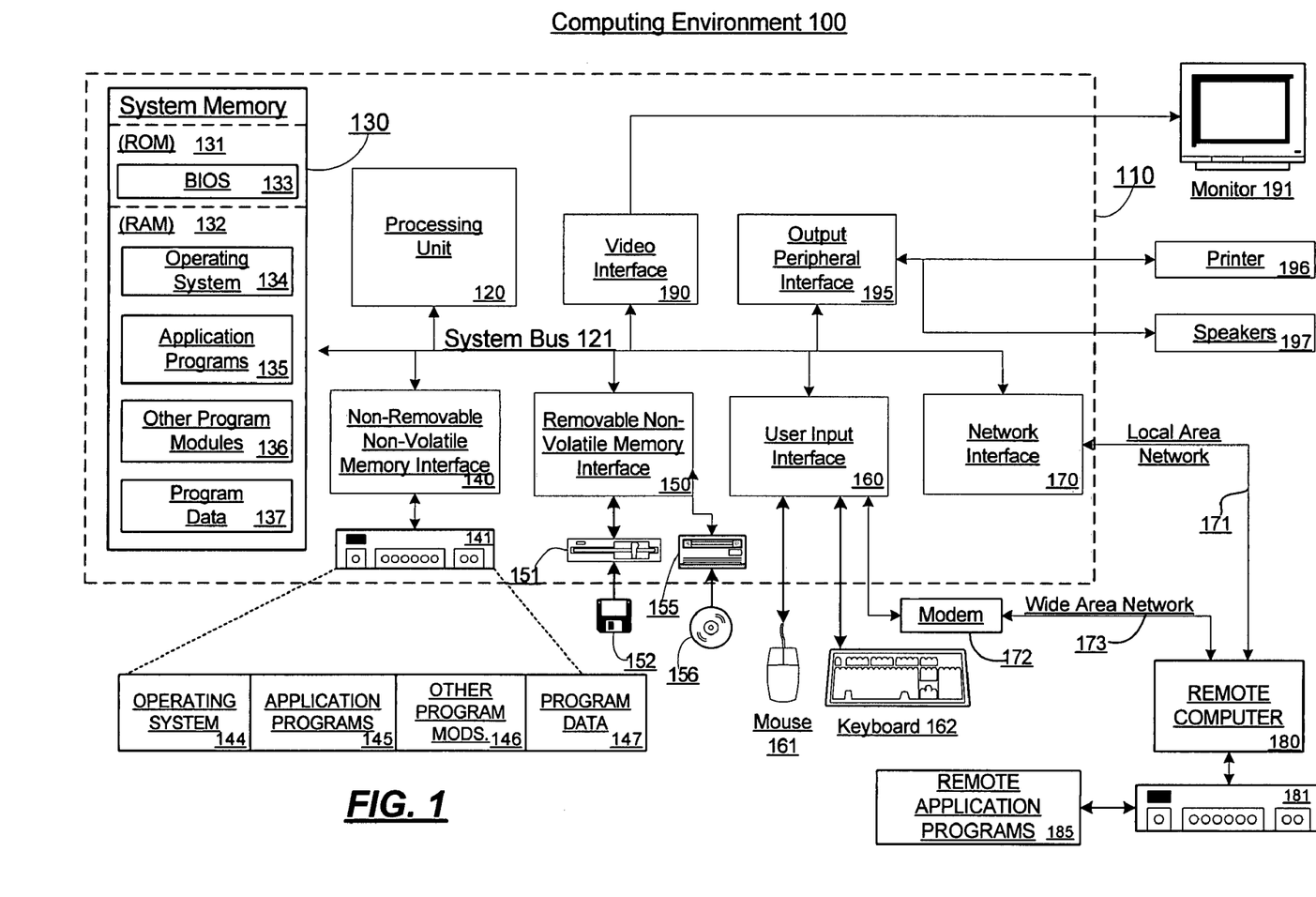
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral. Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Plural Computing Environments on a Single Machine

As previously described, it is known in the art that two operating systems can execute side-by-side on a single computing device. One problem that the present invention addresses is the issue of can be used to address is how to provided some level of separation between two operating system, while still providing for some level of interaction between the two operating systems.

Figure 2:
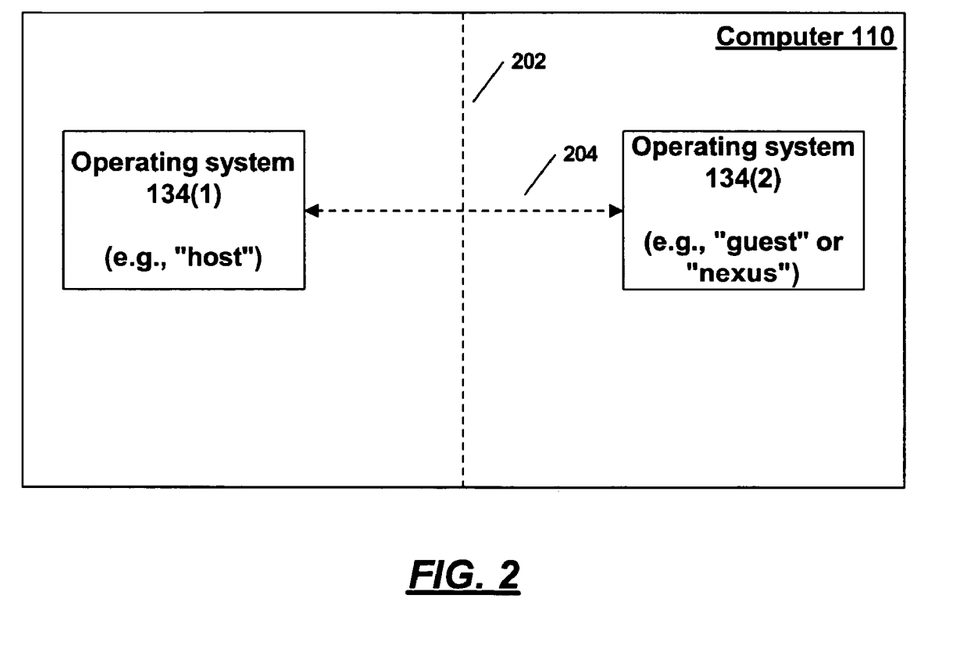
FIG. 2 is a block diagram of two exemplary execution environments that maintain some interaction with each other and some separation from each other.

FIG. 2 shows a system in which two operating systems 134(1) and 134(2) execute on a single computer 110. Some type of logical separation 202 exists between operating systems 134(1) and 134(2), such that a certain amount of interaction 204 is permitted between operating systems 134(1) and 134(2), while still allowing at least one of the operating systems to be protected against events that originate in the other operating system. In the example of FIG. 2, operating system 134(1) is a host operating system, and operating system 134(2) is a guest operating system, such as a "nexus" as described above. As previously noted, when operating system 134(2) is a nexus, it is desirable to construct separation 202 such that operating system 134(2) can interact with operating system 134(1) in order to borrow operating system 134(1)'s infrastructure, while still allowing operating system 134(2) to protect itself from actions (either malicious or innocent) that arise at operating system 134(1) and might cause operating system 134(2) to behave in a manner contrary to its behavioral specifications. (It will be understood, however, that the invention is not limited to the case where operating system 134(2) is a nexus.)

The separation 202 between operating systems 134(1) and 134(2) may, optionally, be enforced with the aid of a security monitor. A security monitor is a component external to both operating systems 134(1) and 134(2), which provides some security services that may be used to protect operating system 134(2) from operating system 134(1). For example, a security monitor may control access to certain hardware, may manage the use of memory (to give operating system 134(2) exclusive use of some portions of memory), or may facilitate the communication of data from operating system 134(1) to operating system 134(2) in a secure way. It should be noted that the use of a security monitor represents one model of how operating system 134(2) can be protected from operating system 134(1), although the use of a security monitor is not required. As another example, operating system 134(2) could include all of the functionality necessary to protect itself from operating system 134(1).

It should be noted that FIG. 2 shows operating system 134(1) as a "host" and operating system 134(2) as a "guest." In general, this characterization refers to the fact that, in these examples, operating system 134(1) provides certain operating system infrastructure that is used by both operating systems 134(1) and 134(2) (e.g., device drivers, scheduling, etc.), and operating system 134(2) is a "guest" in the sense that it preferably lacks this infrastructure but rather uses the infrastructure of operating system 134(1). However, it should be noted that the parameters of what makes an operating system a "host" or a "guest" are flexible. Moreover, it should be noted that traditional concepts of "host" and "guest" operating systems presume that the host needs to protect itself from actions of the guest. In the example of FIG. 2, however, guest operating system 134(2) is presumed to be a high-assurance operating system that needs to protect itself from host operating system 134(1). In the examples that follow, we shall generally refer to operating system 134(1) as the "host" and operating system 134(2) as the "guest" or "nexus" for the purpose of distinguishing between them. It should be appreciated that the techniques described herein can be applied to the interaction of any two or more operating systems running on the same machine (or even on the same set of connected machines).

Secure Input and Output to a Trusted Agent

In order to provide secure input and output to the nexus and to processes running on the nexus ("trusted agents" or "nexus agents") a trusted user interface (UI) engine module is provided on the nexus side. The trusted UI engine provides a common resource for secure input and output functionality for trusted agents.

To provide high-assurance for user input, the trusted UI engine accepts trusted user input. The security of the user input may be secured by encrypting the input. In other embodiments, the security of the user input is verified by other verification means such as a digital signature, or ensured by other means such as secure trusted hardware. The trusted UI engine includes a trusted input manager which then determines the proper destination for the user input. In some cases, the user input should be used on the host side. In such cases, the user input will be placed in an input stack on the host side for the host operating system. However, in some cases, the user input is high-assurance, and is directed by the trusted input manager to the proper destination, for example, to a nexus agent.

To provide high-assurance for output, the trusted UI engine accepts trusted output from agents and other processes to a trusted output manager. The trusted output manager receives this trusted output and handles the display of trusted output in a device-dependent way, based on how the computer system 110 provides trusted output for the nexus. In one embodiment, encrypted memory is used to describe dedicated display areas. This encrypted memory is passed to the host side. Because the memory is encrypted, the host side can not decrypt the memory or create bogus content for the dedicated display areas. In another embodiment, curtained memory is used, along with an embedded video adapter for that memory. The trusted output manager provides nexus agents with the ability to output display data in a device-independent way. While the output is generally described as being visual output, it should be appreciated that the use of a trusted output manager and the techniques described herein can be applied to any type of trusted output (such as audio, printer, or other outputs), and that the invention is not limited to visual output.

Secure Input Functionality of the Trusted UI Engine

With respect to input, according to one embodiment of the invention, the trusted UI engine controls access to trusted input. When a user interacts with programs on a computer system containing a high-assurance operating system, the user does so by means of a user input device, such as mouse 161 or keyboard 162 (from FIG. 1). In one embodiment, some or all of the user input devices may support encryption. Such encrypted devices allow the input device and the nexus to establish a secure connection and can thus prevent a hardware attack. Other input devices may exist which are not encrypted, however, input from unencrypted user input devices is only accepted for the host system, and not for the nexus or any entities running on the nexus.

Figure 3:
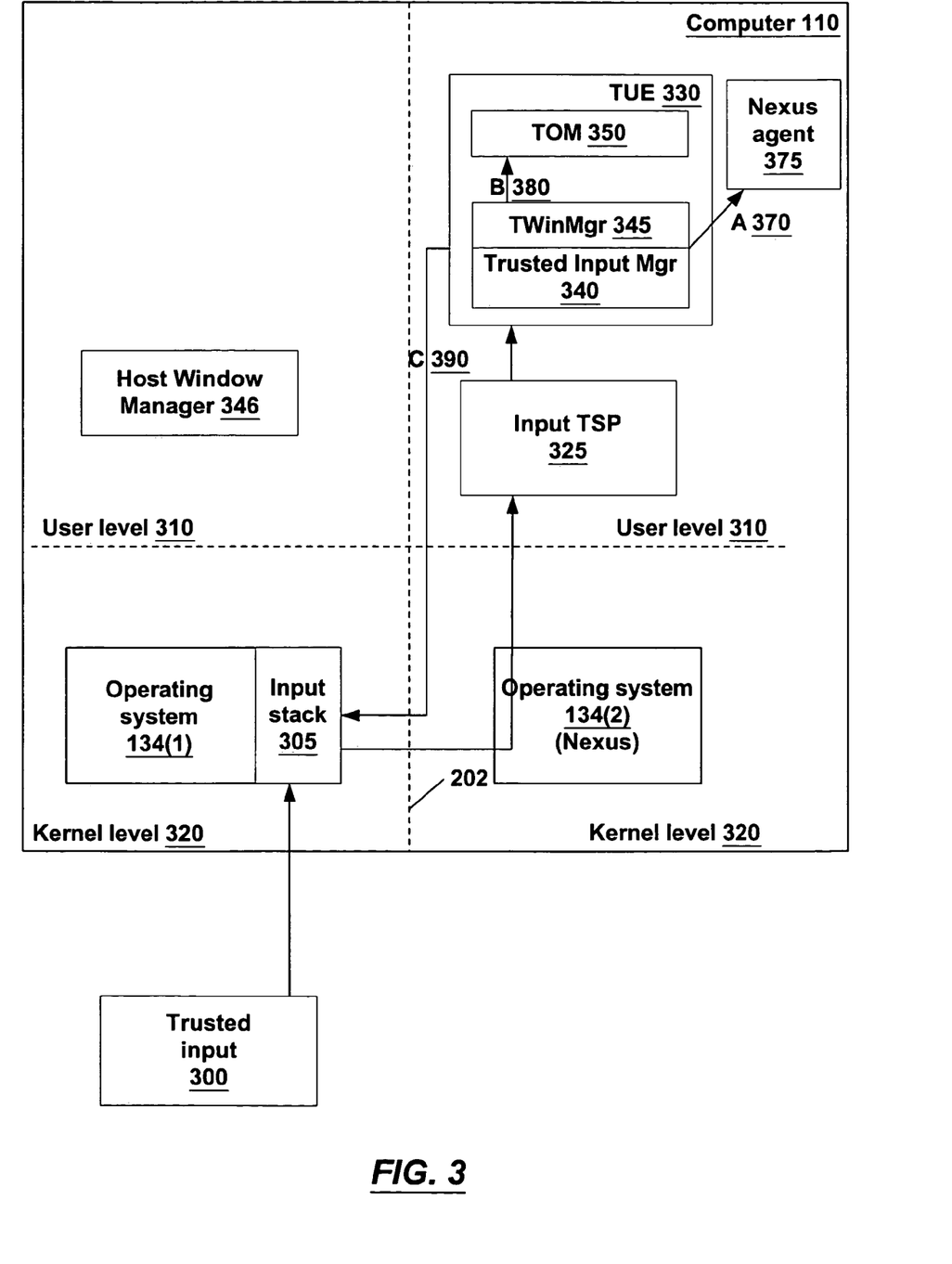
FIG. 3 is a block diagram a computer system with two execution environments showing input according to one embodiment of the invention.

Thus, in order to provide input which is secure, the trusted UI engine, and not a host-side entity, will control the initial flow of at least one stream of user input. FIG. 3 is a block diagram a computer system with two execution environments showing input according to one embodiment of the invention. As shown in FIG. 3, a trusted input device 300 sends encrypted user input data to computer system 110. The encrypted data arrives in the input stack 305 in the host-side operating system 134(1). Because it is encrypted, it can not be used by the host-side operating system 134(1). Thus, it is secured from possible attack on the host side. The encrypted data is passed to the nexus 134(2).

In FIG. 3, both the host side (to the right of logical separation 202) and the nexus side (to the left of logical separation 202) are divided further into user level 310 and kernel level 320. These correspond to distinctions between user level and kernel level execution in operating systems. When the nexus 134(2) receives the encrypted user input data, it is passed to the input trusted service provider (TSP) 325, where the encrypted user input data is decrypted. In some embodiments, the secure input device 300 must establish a communications channel, for example using a shared secret and verification, in order to communicate with computer system 110. Where a communications channel is required with the secure input device 300, the TSP 325 establishes and manages the communication channel with the secure input device. In another embodiment, the user input data is verifiable, and the TSP 325 provides verification for the user input data, for example by verifying a digital signature of the user input data.

The decrypted user input data is then passed to the trusted user interface (UI) engine (TUE) 330, specifically to the trusted input manager 340. A determination is made by the trusted input manager whether the user input should be directed to the host side, or whether it is intended for the nexus or a nexus agent, such as nexus agent 375. If the input is destined for use on the host side, it is restored to the input stack 305 for use on the host side, as shown by arrow C 390. Thus, the decrypted user input data only reaches the host side upon a determination in the nexus side.

In one embodiment, the computer system 110 presents the user with a windowing interface environment, populated with graphical user interface elements such as windows, dialog boxes, and icons. Graphical user interface elements can be associated with or "owned by" processes on the host side or with processes on the nexus side. When using a windowing system, a user's display can be populated with windows, areas on the screen which display information from an application. An application may have one or more windows. One window of all the windows displayed may have focus. The focus window may be indicated by a different border around the window, for example.

In traditional windowing systems, when a window has focus, it is generally the object of the user's input. Therefore, if a user types information using a keyboard, in many cases, the keystroke data will be sent by the operating system to the application which owns the window which has focus. Some keystrokes and other input actions may not be sent to the application which owns the window with focus. For example, in some windowing systems there is a keystroke command which minimizes all windows. Such a command will be handled by the windowing system, and not sent to the application owning the window with focus. The application owning the focused-on window may receive notification of the minimization of the window; however, the user keystrokes are intended for the windowing system, not the application owning the window having focus, and will not be sent to that application.

In one embodiment, the trusted UI engine includes a trusted window manager 345. This trusted window manager 345 manages windows and window behavior for the nexus side. The trusted window manager 345 acts in conjunction with the trusted input manager 340 to determine where user input data should be passed. In one embodiment, this decision is based, at least in part, on whether the window or graphical user element which has focus is owned by a process in the nexus or a process in the host.

The trusted window manager may maintain window decoration such as borders and respond to user input for window functions such as maximization, minimization and resizing of windows. In one embodiment, the trusted window manager also performs some interpretation of the user input data. For example, raw user input data describing that a mouse button has been depressed or that a keystroke has been made, in one embodiment, will be interpreted to a more usable form for a nexus agent, such as nexus agent 375, analogous to the function generally performed by host window manager 346.

If the input is for a nexus agent such as nexus agent 375, the data will be passed from the trusted input manager to the correct destination nexus-mode process. This is illustrated by arrow A 370, which shows user input data being sent to nexus agent 375. In one embodiment, other data may be passed to TOM 350 or to other entities on the nexus side. The display of nexus-side graphical user interface elements is handled by the trusted output manager (TOM) 350 and so mouse movements over nexus-side user interface elements are passed to TOM 350, as shown by arrow B 380.

Figure 4:
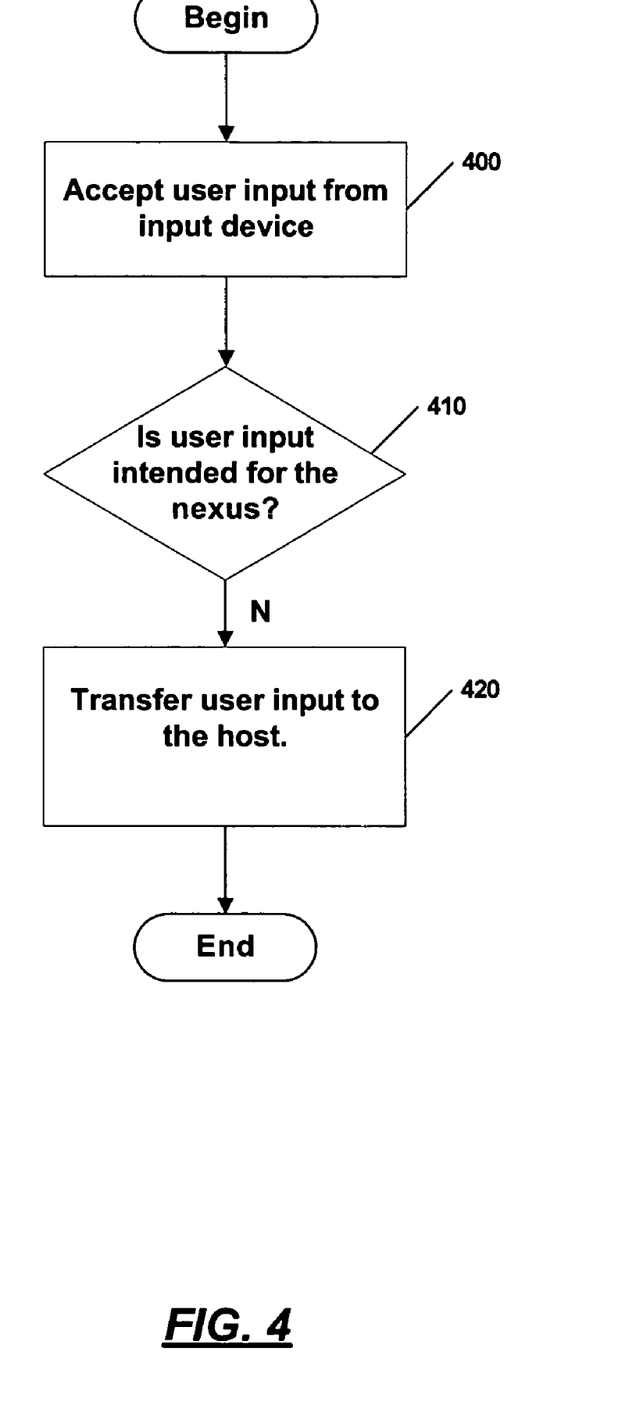
FIG. 4 is a flow diagram of a method for providing secure input from entities in a secured execution environment according to one embodiment of the invention.

FIG. 4 is a flow diagram of a method for providing secure input from entities in a secured execution environment (a nexus) according to one embodiment of the invention. In step 400, user input is accepted from a user input device. In step 410, it is determined whether the user input is intended for nexus, for example if the user input is for an agent running in the nexus. And in step 420, if the user input is not intended for the nexus, the user input is transferred to the host.

Secure Output Functionality of the Trusted UI Engine

Figure 5:
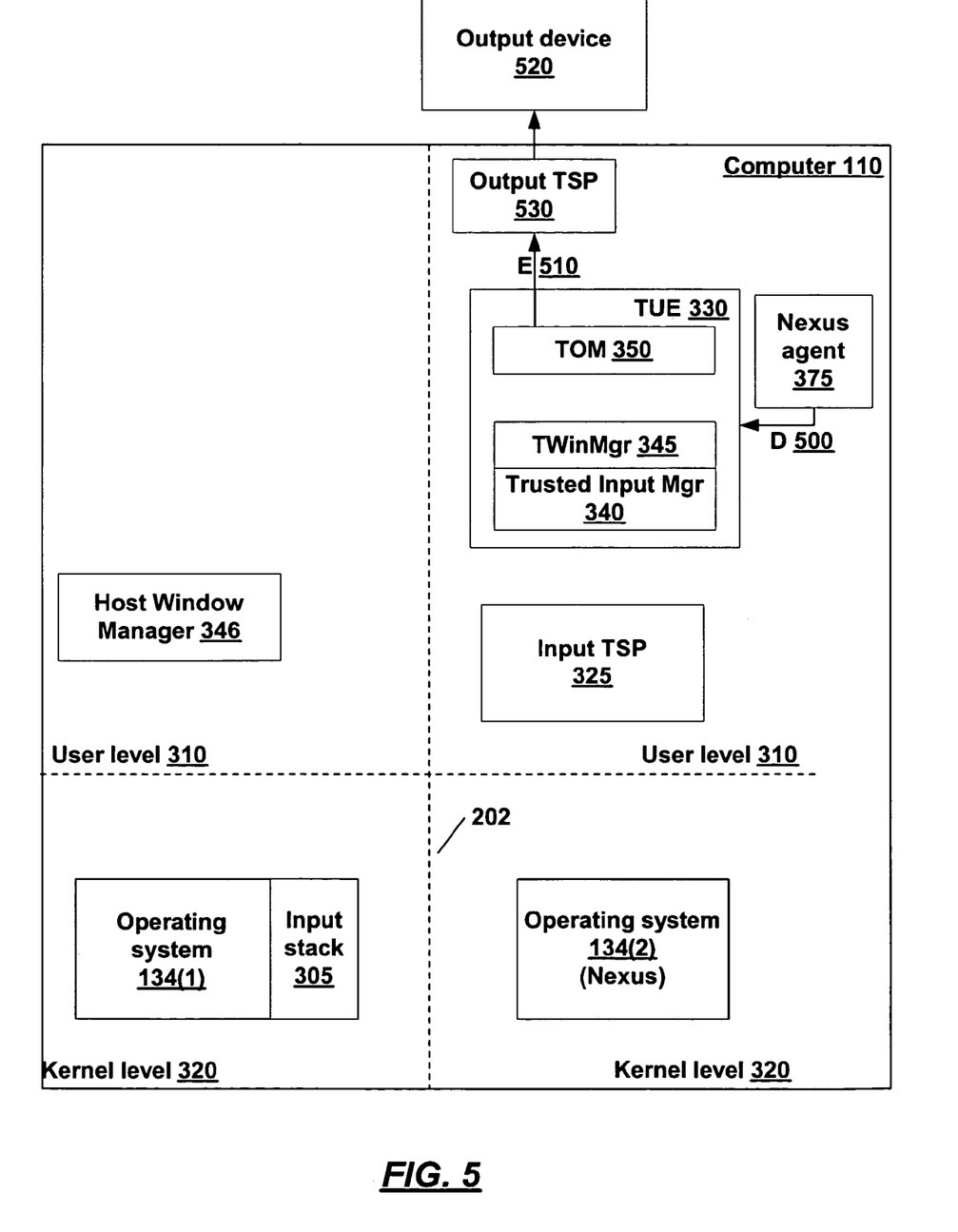
FIG. 5 is a block diagram a computer system with two execution environments showing output according to one embodiment of the invention.

The secure output functionality of the trusted output engine is provided by the trusted UI engine 330 via trusted output manager 350. FIG. 5 is a block diagram a computer system with two execution environments showing output according to one embodiment of the invention. As shown in FIG. 5, arrow D 500, when nexus agent 375 has output for output device 520, that output is relayed to the trusted UI engine 330. In order to provide security for the output, the trusted output manager 340 functions as the contact point for the nexus side with the output trusted service provider (TSP) 530, and thereby with the output device 520, as seen by arrow E 510.

As described above, there are several ways in which output device 520 can be secured. In one embodiment, encryption is used. If output device 520 receives output data in the encrypted form which decrypts correctly, it will prioritize that output data, allowing it to overwrite non-nexus output data on the display. In another embodiment, curtained memory is used. The trusted output manager 350 interacts with the output TSP 530 to maintain security of output device 520.

Independent of the type of security present on the output, the trusted output manager 350 manages all interactions between the nexus side and the output device 520, including handling any output information from the trusted window manager 345, in a computer system 110 incorporating a trusted window manager 345. The output information from windows owned by nexus agents such as nexus agent 375 is handled by the trusted output manager 350. In addition, if any other nexus graphical user interface elements are present, the display of these elements are handled by the trusted output manager. For example, where a mouse moves over such a nexus window, allowing the host side to control the mouse may be difficult without causing security problems. Therefore, the display of the mouse cursor when the mouse is over a nexus window may be handled on the nexus side. The output information of all nexus windows and other nexus graphical user interface elements are composited by the trusted output manager for display. Additionally, any interaction with host window manager 346 is handled by trusted UI engine 330.

Secure Output Functionality of the Trusted UI Engine

Generally, dialog framework services may be provided for processes. These services accept a file describing the desired graphical user interface elements to display. For example, the file may be an XML file with information describing a dialog box to present to the user, including a specified question, response options, and a language to use in presenting the dialog box. The dialog framework service contains the information which renders the correct dialog box. However, relying on a dialog framework service on the host side would introduce security problems. Therefore a trusted rendering interface, in one embodiment, is provided in the trusted UI engine 330. This trusted rendering interface provides a complete dialog framework service for nexus agents such as nexus agent 375. As part of the trusted UI engine 330, the trusted rendering interface receives the information specifying how the graphical user interface element for display, and the trusted rendering interface renders the requested graphical user interface and manages it, alerting the nexus agent 375 when user events occur on active graphical user interface elements within it. In this way, the trusted UI engine 330 provides some of the localization services that nexus agent 375 needs for graphical user interface without requiring the use of localization services in the host side. For example, the trusted UI engine 330 can provide multi-lingual text services.

In one embodiment, a direct rendering interface is provided in the trusted UI engine 330. This direct rendering interface may be provided in addition to the trusted rendering interface, or it may be present even where the trusted rendering interface is not. The direct rendering interface provides the bare-bones mechanism for a nexus agent such as nexus agent 375 which wishes to perform its own rendering. The nexus agent 375 will compute its own screen bitmaps, rather than relying on the trusted UI engine 330 to render them from specifications. The trusted UI engine sends notification of user input actions through the trusted input manager 340.

Figure 6:
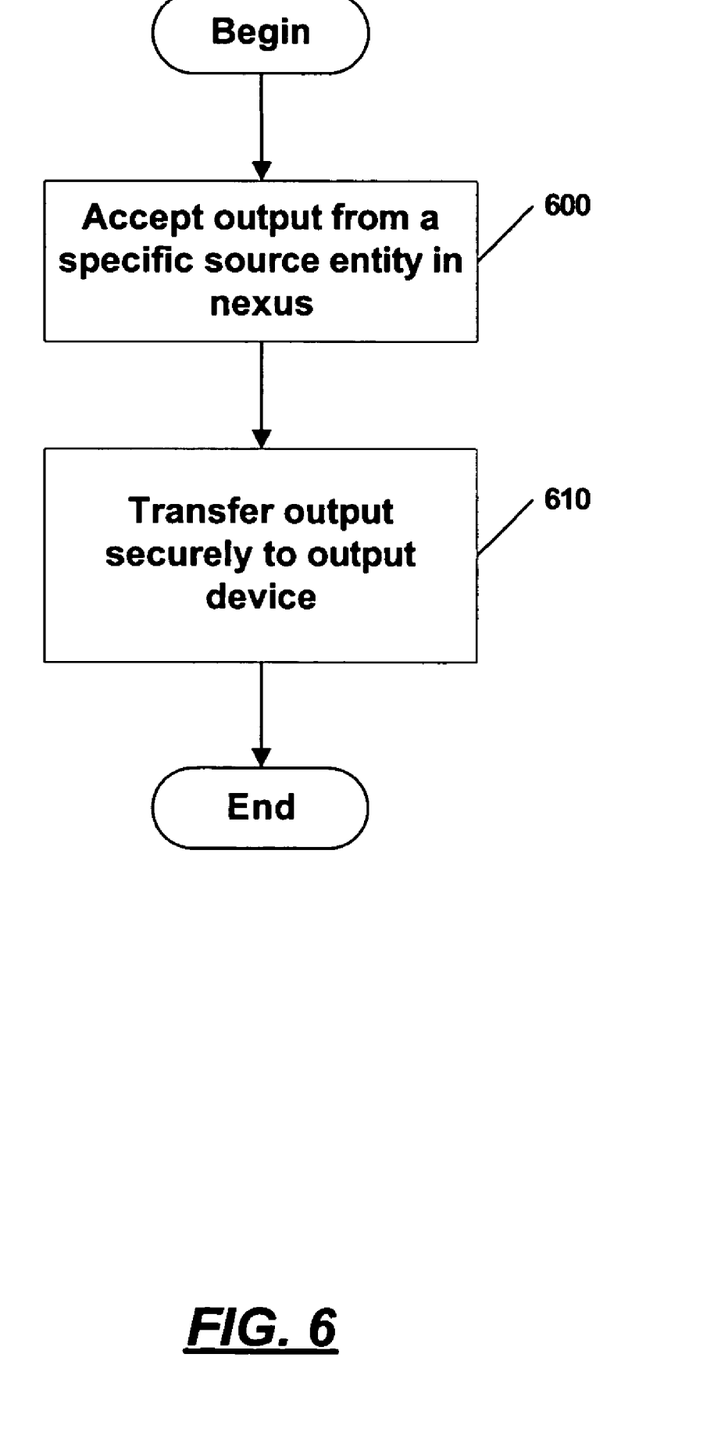
FIG. 6 is a flow diagram of a method for providing secure output from entities in a secured execution environment according to one embodiment of the invention.

FIG. 6 is a flow diagram of a method for providing secure output from entities in a secured execution environment according to one embodiment of the invention. In step 600, output is accepted from a specific source entity in a secured execution environment, such as the nexus. In step 610, the output is transferred securely to an output device.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for providing a secure user interface to a secured execution environment on a system comprising said secured execution environment and a second execution environment, comprising the steps of:
   accepting encrypted user input from a user input device intended for either said secured execution environment or said second execution environment;
   decrypting said encrypted user input;
   determining a graphical user element that has focus from among at least one graphical user elements;
   determining whether a process that owns the graphical user element is in the secured execution environment or in the second execution environment;
   determining, based on whether the process that owns the graphical user element is in the secured execution environment or in the second execution environment, whether said decrypted user input is intended for said secured execution environment;
   if said decrypted user input is not intended for said secured execution environment, transferring said decrypted user input to said second execution environment;
   if said decrypted user input is intended for said secured execution environment, determining a specific destination entity within said secured execution environment for said decrypted user input, and transferring said decrypted user input to said specific destination entity;
   accepting output from a specific source entity within said secured execution environment and not within said second execution environment; and
   securely transferring said output to an output device.

2. The method of claim 1, where said step of accepting user input from a user input device comprises establishing a secure communications channel with said user input.

3. The method of claim 1, where said step of accepting user input from a user input device comprises verifying said user input.

4. The method of claim 1, where said step of transferring said decrypted user input to said specific destination entity comprises:
   interpreting said decrypted user input.

5. The method of claim 1, where said step of securely transferring said output to said output device comprises:
   encrypting said output data.

6. The method of claim 1, where said step of securely transferring said output to said output device comprises:
   transferring said output to a curtained memory.

7. The method of claim 1, where said output contains a data portion, and where said step of securely transferring said output to said output device comprises:
   encrypting said data portion of said output.

8. The method of claim 1, where said step of securely transferring said output to said output device comprises:
   transferring said output to a curtained memory.

9. A computer-readable storage medium containing computer executable instructions to provide a secure user interface to a secured execution environment on a system comprising said secured execution environment and a second execution environment, the computer-executable instructions to perform acts comprising:
   accepting encrypted user input from a user input device intended for either said secured execution environment or said second execution environment;
   decrypting said encrypted user input;
   determining a graphical user element that has focus from among at least one graphical user elements;
   determining whether a process that owns the graphical user element is in the secured execution environment or in the second execution environment;
   determining, based on whether the process that owns the graphical user element is in the secured execution environment or in the second execution environment, whether said decrypted user input is intended for said secured execution environment;
   if said decrypted user input is not intended for said secured execution environment, transferring said decrypted user input to said second execution environment;
   if said decrypted user input is intended for said secured execution environment, determining a specific destination entity within said secured execution environment for said decrypted user input, and transferring said decrypted user input to said specific destination entity;
   accepting output from a specific source entity within said secured execution environment and not within said second execution environment; and
   securely transferring said output to an output device.

10. The computer-readable storage medium of claim 9, where said accepting user input from a user input device comprises establishing a secure communications channel with said user input.

11. The computer-readable storage medium of claim 9, where said accepting user input from a user input device comprises verifying said user input.

12. The computer-readable storage medium of claim 9, where said transferring said user input to said specific destination entity comprises:
   interpreting said user input.

13. The computer-readable storage medium of claim 9, where said output contains a data portion, and where said securely transferring said output to said output device comprises:
   encrypting said data portion of said output.

14. The computer-readable storage medium of claim 9, where said securely transferring said output to said output device comprises:
   transferring said output to a curtained memory.

15. A trusted user interface engine for providing a secure user interface to a secured execution environment on a system comprising said secured execution environment and a second execution environment, comprising:

an input trusted service provider accepting encrypted user input from a user input device and decrypting said encrypted user input, operably connected to said user device;

a trusted input manager for determining a graphical user element that has focus from among at least one graphical user elements, determining whether a process that owns the graphical user element is in the secured execution environment or in the second execution environment, and, determining, based on whether the process that owns the graphical user element is in the secured execution environment or in the second execution environment, whether said decrypted user input is intended for said secured execution environment and, if said decrypted user input is not intended for said secured execution environment, transferring said decrypted user input to said second execution environment, and if said decrypted user input is intended for said secured execution environment, determining a specific destination entity within said secured execution environment for said decrypted user input, and transferring said decrypted user input to said specific destination entity; and a trusted output manager for accepting output from a specific source entity within said secured execution environment and not within said second execution environment and securely transferring said output to an output device.

16. The trusted user interface engine of claim 15, where said input trusted service provider establishes a secure communications channel with said user input.

17. The trusted user interface engine of claim 15, where said input trusted service provider verifies said user input.

18. The trusted user interface engine of claim 15, where said output contains a data portion, and where said trusted output manager encrypts said data portion of said output.

19. The trusted user interface engine of claim 15, where said trusted output manager transfers said output to a curtained memory.

* * * * *